United States Patent [19]
Asada

[11] 3,710,621
[45] Jan. 16, 1973

[54] SING-AROUND TYPE ULTRASONIC MEASURING INSTRUMENT

[75] Inventor: Hidekazu Asada, Tokyo, Japan

[73] Assignee: Kahushikikaisha Tokyo Keiki, Tokyo, Japan

[22] Filed: Feb. 2, 1971

[21] Appl. No.: 111,862

[30] Foreign Application Priority Data

Feb. 10, 1970  Japan .................................45/11261

[52] U.S. Cl. ..............................................73/194 A
[51] Int. Cl. ...............................G01f 1/00, G01p 5/00
[58] Field of Search ....73/194 A, 67.5, 53, 32, 290 V

[56] References Cited

UNITED STATES PATENTS 3,392,574  7/1968  Lemon et al. .............................73/53
2,889,705  6/1959  Hanysz et al. ...................73/67.5 R X
3,327,806  6/1967  Anderson.......................73/194 A UX

*Primary Examiner*—Charles A. Ruehl
*Attorney*—Hill, Sherman, Meroni, Gross & Simpson

[57] ABSTRACT

A sing-around type ultrasonic measuring instrument having an ultrasonic transmitter and an ultrasonic receiver, a receiving amplifier circuit, and a transmitter circuit, in which the amplitude of a received signal derived from the receiving amplifier circuit is detected to produce an automatic gain control signal for automatically stabilizing the amplitude of the received signal and a signal to be transmitted from the transmitter is delayed for a fixed period of time relative to the received signal.

3 Claims, 8 Drawing Figures

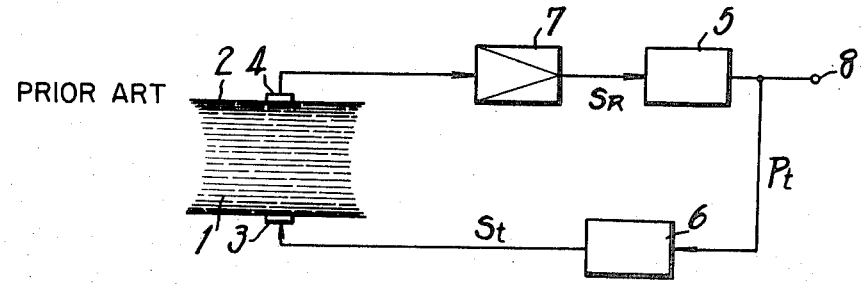
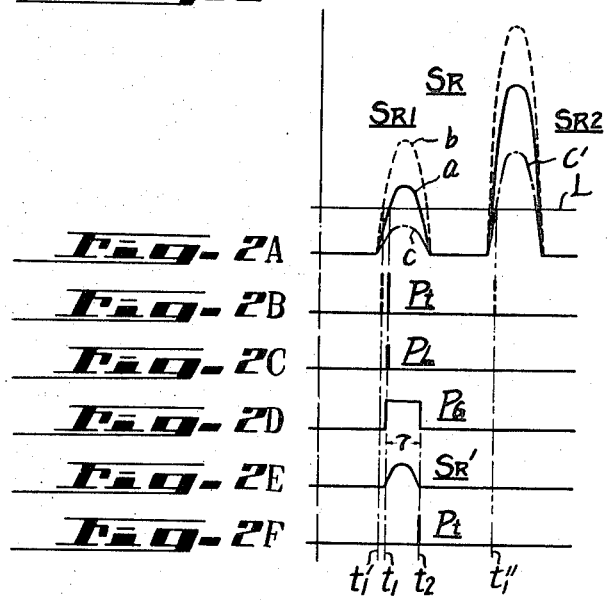
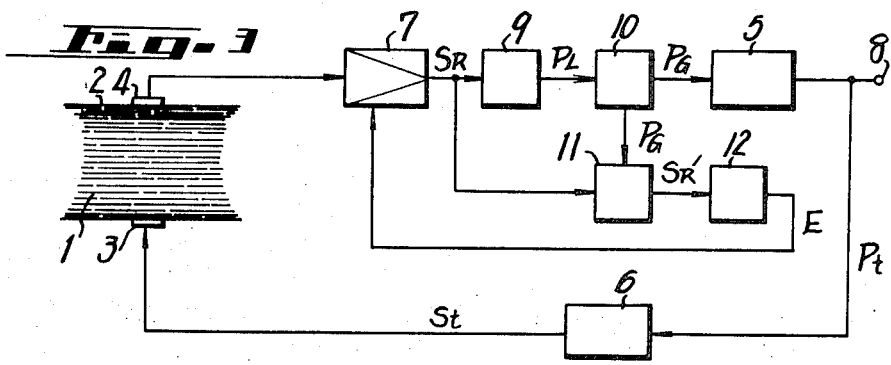

3,710,621

SING-AROUND TYPE ULTRASONIC MEASURING INSTRUMENT

BACKGROUND OF THE INVENTION

1. Field of the Invention

This invention relates to improvements in an ultrasonic measuring instrument of the sing-around type.

2. Description of the Prior Art

In a conventional sing-around type ultrasonic measuring instrument the amplitude of a received signal is detected and used as a gain control signal for stabilization of the amplitude of the received signal. Such an instrument produces a signal to be transmitted substantially simultaneous with the received signal and it is relatively difficult to detect the amplitude of the received signal and the sing-around signal is unstable.

SUMMARY OF THE INVENTION

Accordingly, the primary object of this invention is to provide a sing-around type ultrasonic measuring instrument which is free from defects experienced in the conventional sing-around type ultrasonic measuring instruments.

Another object of this invention is to provide a sing-around type ultrasonic measuring instrument of simple construction in which the amplitude of a received signal is easily detected and which ensures stabilization of the amplitude of the received signal.

BRIEF DESCRIPTION OF THE DRAWING

FIG. 1 is a systematic diagram of a conventional sing-around type ultrasonic measuring instrument applied to a flow meter;

FIGS. 2A–2F are waveform diagrams for explaining the conventional instrument depicted in FIG. 1; and FIG. 3 is a systematic diagram showing one example of a sing-around type ultrasonic measuring instrument of this invention connected to a flow meter.

DESCRIPTION OF THE PREFERRED EMBODIMENT

For a better understanding of this invention, a description of a prior art sing-around type ultrasonic measuring instrument connected to a flow meter will be given with reference to FIG. 1. A fluid 1 such as water flows in a pipe 2. An ultrasonic transmitter 3 and an ultrasonic receiver 4 are mounted on opposite sides of the wall of pipe 2 so as to transmit energy through the fluid.

A trigger pulse $P_t$ derived from a synchronous control circuit 5 is supplied to a transmitter circuit 6 which produces a transmitted signal $S_t$ from the pulse $P_t$. The signal $S_t$ is supplied to the transmitter 3. The transmitter 3 emits an ultrasonic pulse to the receiver 4 through the fluid 1.

A receiving amplifier 7 is connected to the receiver 4 and amplifies the receiver output to provide a signal $S_R$. The received output signal $S_R$ is applied to the synchronous control circuit 5 to provide the trigger pulse $P_t$ at a time when the level of the received output signal $S_R$ has reached a predetermined level L established in the synchronous control circuit 5. The trigger pulse $P_t$ thus produced is fed to the transmitter circuit 6 as previously described.

The basic construction of the conventional sing-around type ultrasonic flow meter operates in this manner. With such an arrangement, the transmitted signal $S_t$ produced from the trigger pulse $P_t$ is supplied to the transmitter 3 and an ultrasonic pulse emitted from the transmitter 3 is received by the receiver 4. The signal from the receiver 4 is amplified by the amplifier 7 to produce signal $S_R$ and the trigger pulse $P_t$ is derived by the synchronous control circuit 5 from signal $S_R$. The operation is repeated to provide the so-called sing-around system. As a result, a sing-around signal having a frequency corresponding to the frequency of transmission is provided at an output terminal 8 from the synchronous control circuit 5. The frequency of the signal at the output terminal 8 is proportional to the velocity of flow of fluid 1 and thus the flow rate of the fluid 1 can be determined from the frequency of the signal at output terminal 8.

In prior art sing-around type flow meters the received signal $S_R$ supplied to the synchronous control circuit 5 is in the form of a train of positive and negative pulses each corresponding to each trigger pulse $P_t$ derived from the synchronous control circuit 5. The amplitudes of these signals become gradually larger and are then attenuated. The first and second positive pulses of the received signal $S_R$ are indicated as $S_{R1}$ and $S_{R2}$ in FIG. 2A.

Generally, in the sing-around system the synchronous control circuit 5 is designed to generate the trigger pulse Pt when the level of the first positive pulse $S_{R1}$ of the received signal $S_R$ has reached a predetermined level L shown in FIG. 2A which is set in the synchronous control circuit 5. For example, in the event that the amplitude of the pulse $S_{R1}$ varies as indicated by full-line and broken-line curves $a$ and $b$ in FIG. 2A due to a change in the concentration of a certain component in the fluid 1 or to its turbidity, the time at which the trigger pulse $P_t$ is generated changes from $t_1$ to $t_1'$ as depicted in FIG. 2B. As a result, a stable sing-around frequency signal cannot be obtained when the amplitude of pulse $S_{R1}$ is varying. When the amplitude of the pulse $S_{R1}$ does not reach the level L as indicated by a chain line $c$ in FIG. 2A, the trigger pulse $P_t$ is produced for the first time at a time $t_1''$. This is the time when the level of the second positive pulse $S_{R2}$ shown as curve $c$ reaches the level L as indicated by a chain line curve $c'$ in FIG. 2A. This causes the sing-around frequency signal to be unstable.

FIG. 3 illustrates one example of the sing-around type ultrasonic measuring instrument of this invention. In FIG. 3, elements corresponding to those in FIG. 1 are indicated by the same reference numerals and the detailed description of those elements will not be repeated. Between the receiving amplifier 7 and the synchronous control circuit 5 is connected a level detector circuit 9, for example, which might be a Schmitt circuit which receives the received signal $S_R$ from the amplifier 7 and a control signal generator circuit 10 which might be, for example, a monostable circuit which receives the output $P_L$ of the level detector circuit 9. The signal $S_R$ derived from amplifier 7 is also applied to a gate circuit 11 which is controlled by a control signal $P_G$ produced by the control signal generator circuit 10. An output $S_R'$ of the gate circuit 11 is fed to a DC smoother circuit 12. The DC output E of circuit 12 is fed as an automatic gain control signal back to the amplifier 7, thereby to control the gain of the received signal $S_R$ at the output of amplifier 7.

With the above arrangement, the set level of the level detector circuit 9 is selected such that a pulse PL shown in FIG. 2C is obtained at the output of the level detector circuit 9 at a time $t_1$ when the level of the full line pulse of the first positive pulses $S_{R1}$ indicated by the full line $a$ in FIG. 2A has first reached the level L. The pulse $P_L$ thus obtained is supplied to the control signal generator circuit 10 which derives the rectangular control signal $P_G$ depicted in FIG. 2D which starts at time $t_1$ and continues for a predetermined time $\tau$. The control signal $P_G$ is supplied to the gate circuit 11 for gating it. One portion of the received signal $S_R$ is also applied to the gate circuit 11. The time for opening the gate circuit 11 is preselected to correspond to the time $\tau$ between $t_1$ and $t_2$ in such a manner that the trailing edge of the gate signal $P_G$ is before the first positive pulses $S_{R1}$ indicated by full line $a$ reaches the level L the next time. As a result, a pulse $S_R'$ such as depicted in FIG. 2E which corresponds to that portion of the pulse of the first positive pulses $S_{R1}$ indicated by the full line $a$ exceeding the level L occurs at the output of gate circuit 11. The output $S_R'$ is applied to the DC smoother circuit 12 and a DC output E proportional to the amplitude of $S_R'$ is obtained as an automatic gain control signal. The automatic gain control signal is fed back to the amplifier 7 to stabilize the amplitude of the signal $S_R$ and thus prevent it from varying.

The synchronous control circuit 5 is adapted to provide the trigger pulse $Pt$ based on the control signal $P_G$ derived from the control signal generator circuit 10. The trigger pulse $Pt$ is produced at the time $t_2$ which corresponds to the trailing edge of the control signal $P_G$ as depicted in FIG. 2F. Thus, the transmitted signal $St$ and the received signal $S_R$ are delayed for a time $t_1$ behind the pulse $Pt$ which corresponds to the width $\tau$ of the control signal $P_G$ and the signals $St$ and $S_R$ are not obtained concurrently. This assures more stable detection of the amplitude of the received signal $S_R$ than when both signals $St$ and $S_R$ are produced simultaneously.

Thus, the present invention has the advantages that the sing-around frequency signal can be derived stably at the output terminal 8 and the construction is simple. With this invention, however, the transmitted signal $St$ is delayed behind the received signal $S_R$ by a time corresponding to the width of the control signal $P_G$. However, this delay time is constant and an indicator can be calibrated so as to compensate for such delay. Further, in practice, this delay time is much smaller than the sing-around frequency and is negligible.

Although the present invention has been described as being applied to a flow meter, it will be understood that the invention is applicable to any other ultrasonic measuring instrument which uses the sing-around system with ultrasonic waves for measurement.

The foregoing description has used the positive going portions of the received signal $S_R$ but the negative going portion of the signal can also be used.

It will be apparent that many modifications and variations may be effected without departing from the scope of the novel concepts of this invention.

I claim:
1. A sing-around ultrasonic measuring instrument comprising:
an ultrasonic transmitter;
an ultrasonic receiver mounted so as to receive energy radiated from said transmitter after it has passed through a medium;
a receiver variable gain amplifier connected to said ultrasonic receiver;
a level detector circuit connected to the output of said receiver amplifier;
a control signal circuit connected to said level detector circuit and producing a rectangular output pulse of fixed amplitude and width in time;
a synchronous control circuit connected to receive said rectangular pulse from said synchronous control circuit and to produce an output pulse coincident with the trailing edge of said rectangular pulse;
an output terminal connected to the output of said synchronous control circuit; and
a transmitter drive circuit connected to said synchronous control circuit and supplying an input to said ultrasonic transmitter so as to drive it at a time delayed from said receiver output corresponding to the width of said rectangular pulse.

2. A sing-around ultrasonic measuring instrument according to claim 1 further including a gate circuit receiving inputs from said receiver amplifier and said control signal circuit and supplying a gain control signal to said receiver amplifier.

3. A sing-around ultrasonic measuring instrument according to claim 2 including a direct current smoother circuit connected between said gate and said receiver amplifier.

* * * * *